United States Patent [19]

Sillars

[11] 4,147,288
[45] Apr. 3, 1979

[54] SIDE SEAM SOLDERING MACHINE WITH MEANS FOR PROTECTING PRE-STRIPING

[75] Inventor: Frederick S. Sillars, Beverly, Mass.

[73] Assignee: USM Corporation, Farmington, Conn.

[21] Appl. No.: 874,804

[22] Filed: Feb. 3, 1978

[51] Int. Cl.² .............................................. B23K 1/16
[52] U.S. Cl. ...................................... 228/43; 228/215
[58] Field of Search ....................... 228/37, 39, 43, 47, 228/49 R, 215

[56] References Cited
U.S. PATENT DOCUMENTS 3,371,837  3/1968  Sillars ...................................... 228/43
3,371,839  3/1968  Sillars ................................. 228/47 X Primary Examiner—C. W. Lanham
Assistant Examiner—Kenneth J. Ramsey
Attorney, Agent, or Firm—Carl E. Johnson; Richard B. Megley; Vincent A. White

[57] ABSTRACT

In a side-seam soldering machine wherein successive can bodies are fed and their side-seams progressively soldered by an applicator means, a solder deflecting member (which would otherwise interfere with an internal pre-stripe or coating) is mounted for cooperation with the can feeding means to insure that the member does not adversely affect the pre-stripe or coating, but does prevent solder from being introduced between successive can bodies and deposited therein.

7 Claims, 4 Drawing Figures

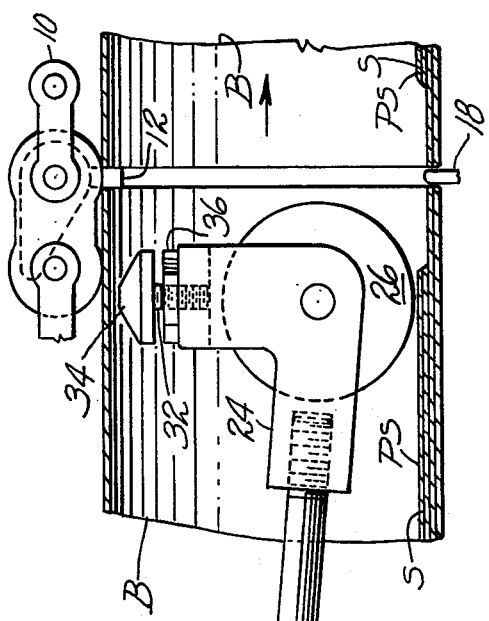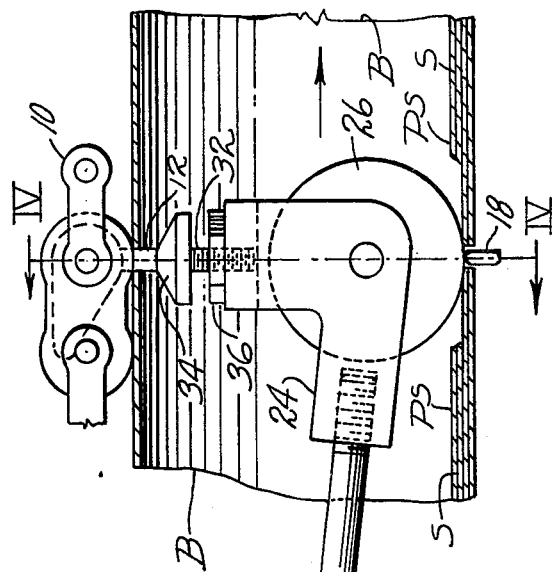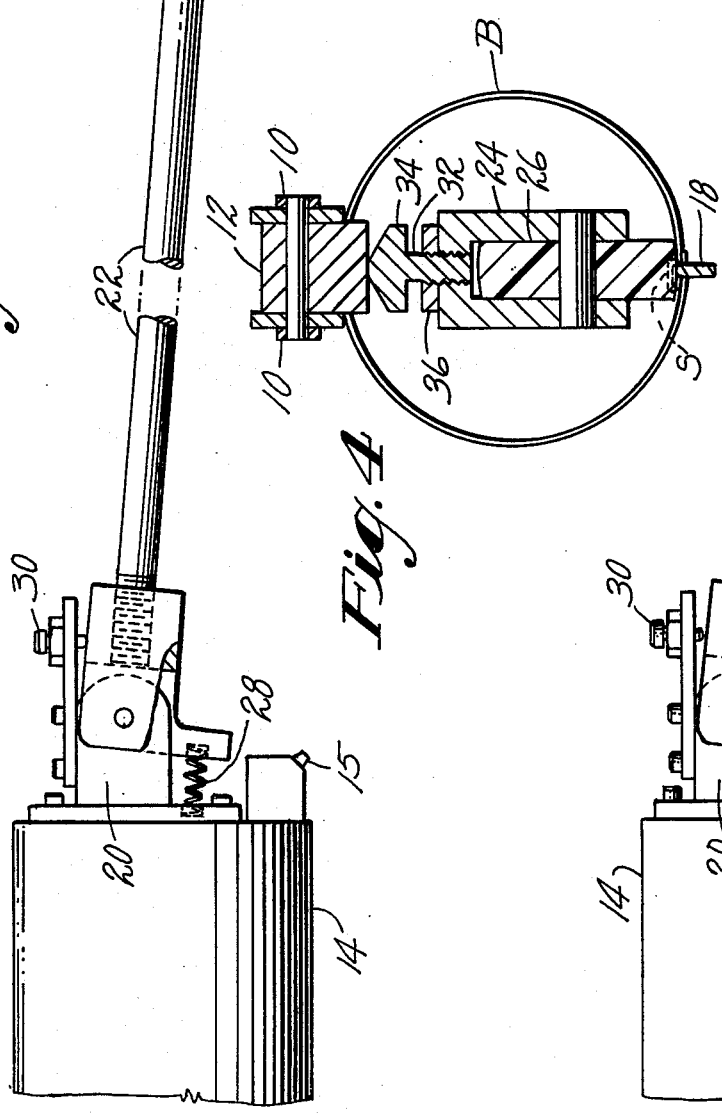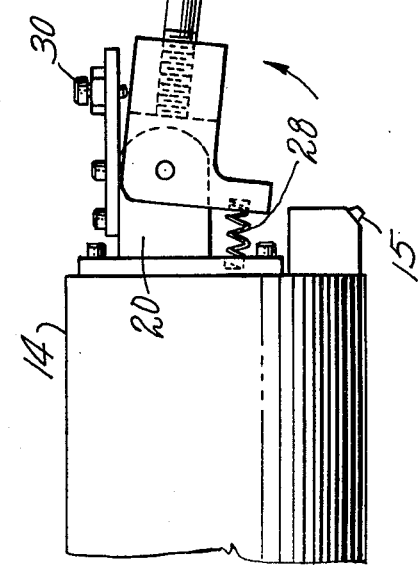

SIDE SEAM SOLDERING MACHINE WITH MEANS FOR PROTECTING PRE-STRIPING

BACKGROUND OF THE INVENTION

This invention pertains to can making and more particularly to means for sealing their seam joints.

As shown, for instance, in U.S. Pat. No. 3,000,338 issued in my name, can bodies to be side-seam soldered are often advanced in a row to and through a soldering station by means of feed dogs uniformly spaced along an endless chain and engageable with a respective trailing edge of the bodies. Though closely spaced, the aligned can bodies are not contiguous. Since the solder is preferably to be flowed or deposited continuously from outside of the bodies by jet or other suitable applicator means, solder can flow into the gap between adjacent bodies and project into their leading and/or trailing end portions unless protective measures are taken. One approach to prohibiting such entry of the unwanted molten solder is to employ an internal shield or roll biased by a counterweight or otherwise for engagement with the inside of the cans opposite to the locality of solder application. An arrangement of this type is disclosed, for example, in U.S. Pat. No. 3,371,837 issued in my name.

It is a common practice, however, to apply prior to side-seam soldering an internal protective spray or coating which may cover the entire can interior protectively (or for the protection of foodstuff to be contained), and to apply internally along the side seam to which solder is to be directed only a band of suitable lacquer of the like. This band is termed a "pre-stripe". It may still be wet or not yet toughened when the can body is to be soldered. In the circumstances, it is important that the pre-stripe, or any internal coating adjacent to the side seam, not be impaired or its integrity disturbed either by influx of excess solder or by a shielding device such as a roll used to plug the end gaps between successive side seams.

SUMMARY OF THE INVENTION

In view of the foregoing it is a main object of this invention to provide, in side seam soldering apparatus, a simple means for insuring the integrity of a pre-stripe or other internal sealant of successive can bodies to be side seam soldered, which means shall also be effective to prevent inflow of molten solder between adjacent ends of the side seams.

For this purpose, and as herein shown, the known side seam soldering apparatus is modified, according to the present invention, but preferably only to a small extent since the chain lug feed and internal deflector or shield roll referred to are retained. As herein illustrated the roll is now biased for movement away from the path of the pre-striping and intervening gaps between can ends, and a cam associated with means mounting the roll is arranged to be engaged by successive body feeding lugs to cause the circumference of the roll only to engage the ends of adjacent bodies and be cleared from contact with the remainder thereof and any sealant thereon.

BRIEF DESCRIPTION OF THE DRAWINGS

The foregoing and other features of the invention will now be more particularly described in connection with an illustrative embodiment and with reference to the accompanying drawings, in which:

FIG. 2 is an enlarged view in side elevation of mechanism shown in FIG. 1 and including a pivotally mounted solder shield roll clear of a can pre-stripe and side seam;

FIG. 3 is a view similar to FIG. 2 but showing parts at a subsequent stage when the roll is blocking entry of solder between cans; and FIG. 4 is a transverse section taken on the line IV—IV of FIG. 3.

DESCRIPTION OF THE PREFERRED EMBODIMENT

Figure 1:
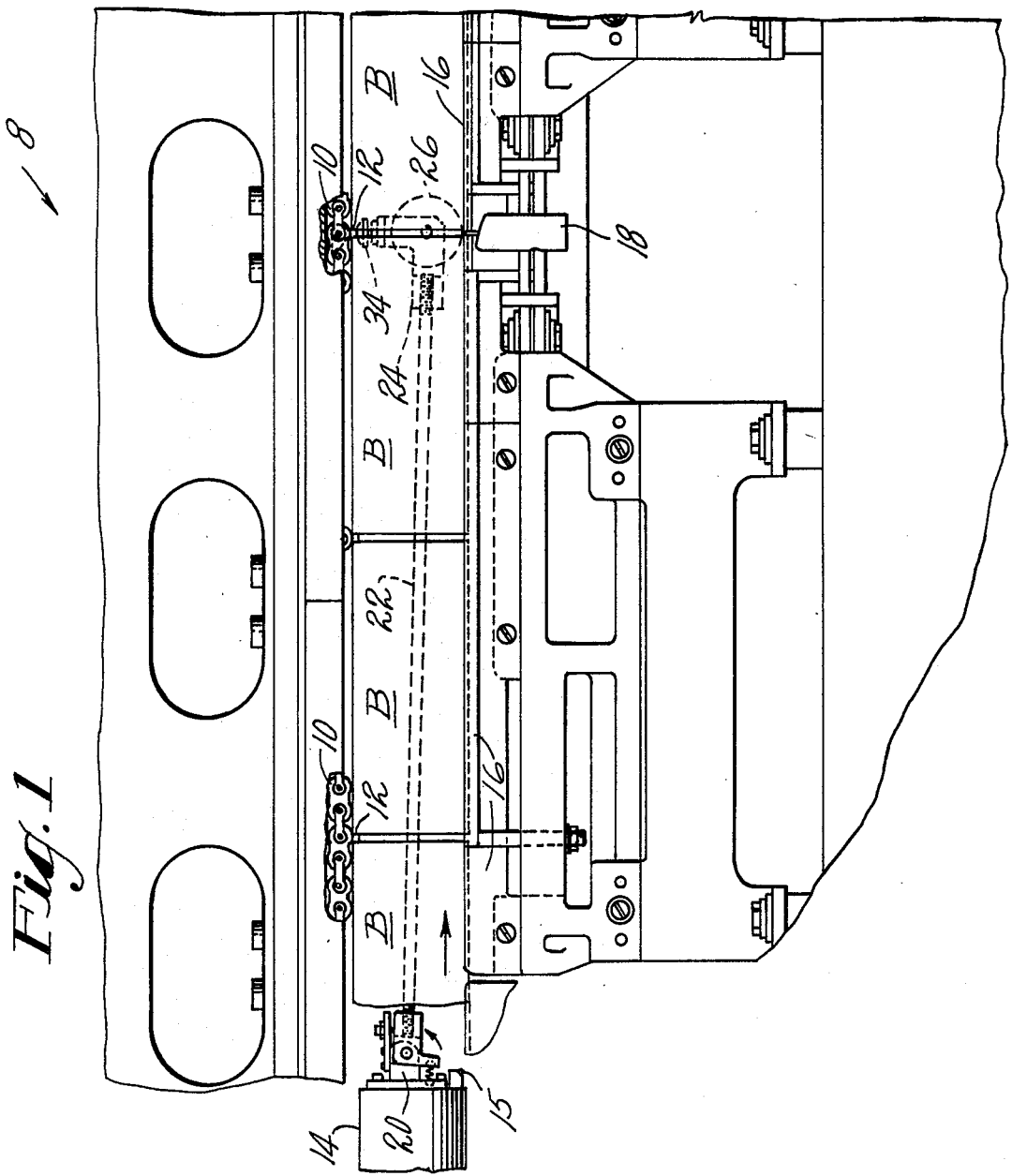
FIG. 1 is a view in side elevation, with portions broken away, of a side seam soldering machine incorporating my novel means for automatically shutting out, from consecutive cans, solder being progressively applied.

FIG. 1 shows "tin" can bodies B that have been formed in a conventional bodymaker, not illustrated and which are being moved through a side seam soldering machine generally designated 8 from left to right in uniformly spaced, lineal order by conveyor means comprising an endless chain 10 having feed dogs 12. These dogs 12 are at predetermined intervals for respectively engaging the trailing edge of one body B. Since, as shown, the leading edge of a body B engages a feed dog 12, the bodies are spaced longitudinally by the length of the dogs, but it is customary to provide means (not shown) for increasing the body spacing if desired.

On arriving from the bodymaker, the bodies are guided from their forming horn successively onto a so-called stub horn 14 (FIGS. 1-3) extending substantially parallel to and just above body supporting and guide members generally designated 16 in FIG. 1. The stub horn 14 remains stationary and supports a continuously operative side stripe spray head 15. As indicated in FIG. 4, the can bodies B are fed in a row and with their side seams S aligned at the lower side. The members 16 may comprise spaced guide rails and an endless support chain (not shown) such as set forth, for instance, in U.S. Pat. No. 3,255,945 issued in my name. At a suitable downstream locality along the path of the side seams S, a solder applicator mechanism 18 of any suitable type is arranged to continuously flow molten solder into and onto the aligned, successive body side seams S. Although the mechanism 18 is for convenience herein represented by a fluid jet nozzle, it will be understood that other types of applicators, including for instance, a rotary disc wetter and presser type such as disclosed in U.S. application for patent, Ser. No. 766,779, filed Feb. 8, 1977 in my name, now U.S. Pat. No. 4,093,113, may be employed.

It will be understood that upon forming the body side seams S they may next be coated with a stripe of protective enamel PS (FIGS. 2,3). This internal coating is generally referred to as "pre-striping" and it is important to retain its integrity. Since conventional solder shielding means effectively excluding solder from entering between adjacent can bodies B would damage or remove pre-striping (which may still be wet) from the side seams S, the present invention is directed, as next explained, towards preserving the exposed pre-striping PS unimpaired while enabling operation of the usual shielding, for example a solder deflector wheel.

Referring to FIGS. 2 and 3, there is secured to an end of the stub horn 14 a block 20 for pivotally mounting an arm 22 adjustably carrying an elbow 24 rotatably mounting a solder deflector wheel 26. A compression spring 28 seated in a bore in the block 20 bears endwise on a depending portion of the arm 22 to urge the wheel 26 upwardly to an inoperative position out of contact with the side seams and prestriping PS as shown in FIG. 2. The limit of such upward movement is adjustably determined by a set screw 30 movable heightwise for initial setting-up purposes and engageable endwise with a portion of the arm 22. As shown in FIGS. 2-4, the elbow 24 threadably receives a cam-screw 32 the rounded head 34 of which is arranged to be engaged and depressed by the lower end of the successive driving dogs 12. A lock nut 36 is preferably provided on the cam screw 32 to insure that the perimeter of the wheel 26 will, upon adjacent ends of the bodies B passing the applicator mechanism 18, be appropriately secured heightwise to be lowered to its solder-excluding position shown in FIGS. 3 and 4, the camming action of the dog 12 on the cam screw and hence on the wheel 26 overcoming resistance of the spring 28. Although the wheel 26 will contact and possibly disturb extreme ends of the body end laps, it will be understood that this small area of prestriping is later enveloped in the double seam when a can end is applied. Upon passage of the dog 12 from engagement with the cam screw 32, the wheel is again automatically raised by the spring 28 to clear the prestriping until the next feed dog 12 again depresses the wheel at the gap between the next pair of adjacent bodies B.

It will be apparent from the foregoing that the invention provides a simple means for insuring that prestriping PS remains intact yet the solder deflector wheel 26 is made capable of automatically preventing the continuously operating applicator means from injecting solder into the leading and trailing ends of the can bodies. It will also be clear that in many details and combinations of parts the structure may be vaired from that illustrated herein by way of example without departing from this invention. The mechanism of the invention permits processing of cans of different sizes, i.e. in length and/or in diameter and, in many existing side-seam soldering machines and they would require but little modification for the invention to be incorporated. The wheel 26 may be of heat resistant material, such as a Teflon, and of course has a peripheral width adequate to block entry into each body B of the solder emitted from the applicator 18 between adjacent can body ends.

Having thus described my invention what I claim as new and desire to secure as Letters Patent of the United States is:

1. In a machine for soldering seam joints of successive bodies and of the type comprising a continuously operable solder applicator and means for feeding the successive bodies with their seam joints aligned and spaced along a path to receive molten solder from the applicator, a solder deflecting member mounted on the opposite side of said path from the solder applicator for movement into position to block flow of the solder therefrom into the gap between the ends of adjacent seam joints, means urging the member away from the path, and mechanism operable by said feed means to move the solder deflecting member against the influence of said urging means into said solder blocking position.

2. A machine as in claim 1 wherein said mechanism comprises a cam.

3. In a machine for soldering the side seams of can bodies successively movable by a chain and in a row with their side seam joints arranged along a path, a continuously operable applicator for directing molten solder to the exterior of the successive seam joints at a locality along the path, a solder deflecting member disposed within the successive bodies and movable toward and from said locality, mechanism actuatable by operation of the chain to press said member into solder deflecting relation between adjacent ends of the successive seam joints, and other mechanism effectively operable when said pressing mechanism is inoperative to relatively separate the member and said seam joints to prevent interference of the member with prestriping on the joints.

4. A side seam soldering machine as in claim 3 wherein the chain is fitted with feed lugs spaced to engage the trailing rim of each body, and said pressing mechanism comprises a cam operable by the successive lugs.

5. A machine as in claim 4 wherein said member is a wheel or roll having a circumference of a width approximating the width of a pre-stripe of sealant interiorly on said joints, and said other mechanism comprises a spring effective to lift the roll circumference from the prestripe when not overcome by said cam.

6. A machine as in claim 4 wherein said cam is in the form of a cam-screw having threaded relation to supporting structure for the roll whereby the latter may be relatively adjusted, in its pressing relation with respect to the ends of said seam joints.

7. A machine as in claim 6 wherein the roll is journalled on one end of a support extending axially through at least one of the series of bodies being fed, and a stub horn for guiding the bodies toward the applicator, the other end of said support being pivotally secured to said stub horn.

* * * * *